(12) United States Patent
Chen et al.

(10) Patent No.: US 11,352,296 B2
(45) Date of Patent: Jun. 7, 2022

(54) POLYMER-MODIFIED CEMENTITIOUS COMPOSITION

(71) Applicant: Dow Global Technologies LLC, Midland, MI (US)

(72) Inventors: Jitao Chen, Shanghai (CN); Yan Li, Shanghai (CN); Ke Shi, Shanghai (CN); Tao Wang, Shanghai (CN); Tong Sun, Shanghai (CN); Shaoguang Feng, Shanghai (CN); Xiaohong Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 104 days.

(21) Appl. No.: 17/051,022

(22) PCT Filed: Apr. 28, 2018

(86) PCT No.: PCT/CN2018/085046
§ 371 (c)(1),
(2) Date: Oct. 27, 2020

(87) PCT Pub. No.: WO2019/205121
PCT Pub. Date: Oct. 31, 2019

(65) Prior Publication Data
US 2021/0139372 A1    May 13, 2021

(51) Int. Cl.
| | | |
|---|---|---|
| *C04B 28/02* | (2006.01) |
| *C08F 220/18* | (2006.01) |
| *C04B 16/06* | (2006.01) |
| *C04B 28/04* | (2006.01) |
| *C04B 103/40* | (2006.01) |
| *C04B 103/44* | (2006.01) |
| *C04B 103/50* | (2006.01) |
| *C04B 111/00* | (2006.01) |
| *C04B 111/27* | (2006.01) |

(52) U.S. Cl.
CPC ............ *C04B 28/02* (2013.01); *C04B 16/065* (2013.01); *C04B 28/04* (2013.01); *C08F 220/1804* (2020.02); *C04B 2103/408* (2013.01); *C04B 2103/44* (2013.01); *C04B 2103/50* (2013.01); *C04B 2111/00482* (2013.01); *C04B 2111/27* (2013.01)

(58) Field of Classification Search
CPC ... C04B 14/06; C04B 16/065; C04B 24/2641; C04B 28/02; C04B 28/04; C04B 212/08; C04B 2103/408; C04B 2103/44; C04B 2103/50; C04B 2111/00482; C04B 2111/27; C08F 212/08; C08F 220/06; C08F 220/20; C08F 220/283; C08F 220/1804; C08F 222/02

See application file for complete search history.

(56) References Cited

U.S. PATENT DOCUMENTS

| | | |
|---|---|---|
| 5,576,378 A | 11/1996 | Kuhlmann et al. |
| 6,599,972 B2 | 7/2003 | Thames et al. |
| 6,617,387 B2 | 9/2003 | Dreher et al. |
| 7,285,590 B2 | 10/2007 | Holub et al. |
| 9,023,919 B2 | 5/2015 | Krueger et al. |
| 9,054,382 B2 | 6/2015 | Kang et al. |
| 2002/0028287 A1 | 3/2002 | Kawada et al. |
| 2002/0049265 A1* | 4/2002 | Dreher ............... C04B 24/2688 524/379 |

FOREIGN PATENT DOCUMENTS

| | | |
|---|---|---|
| CA | 2489821 | 1/2004 |
| CN | 102344522 | 2/2012 |
| CN | 102770995 | 11/2012 |
| CN | 103952044 | 7/2014 |
| CN | 106749875 | 5/2017 |
| EP | 1182178 A2 | 2/2002 |
| KR | 1692805 B1 | 1/2017 |
| WO | 2016001256 | 1/2016 |
| WO | 2017083078 | 5/2017 |

OTHER PUBLICATIONS

Search report from corresponding European 18915888.4 application, dated Jan. 3, 2022.
Fox, Bulletin of the American Physical Society, 1956, p. 123, vol. 1, No. 3.

* cited by examiner

*Primary Examiner* — Anthony J Green

(57) ABSTRACT

A polymer-modified cementitious composition comprising a specific aqueous polymer dispersion and a cementitious material, and such polymer-modified cementitious composition having low ammonia release and providing coating membranes made therefrom with balanced tensile strength and elongation at break.

11 Claims, No Drawings

POLYMER-MODIFIED CEMENTITIOUS COMPOSITION

FIELD OF THE INVENTION

The present invention relates to a polymer-modified cementitious composition and a method of preparing the same.

INTRODUCTION

Aqueous or waterborne polymer dispersions are becoming increasingly more important than solvent-based coating compositions for less environmental problems. Two-component polymer-modified cementitious compositions comprising aqueous polymer dispersions and cementitious materials are widely used waterproofing materials in architectural coating applications in China. Conventional aqueous polymer dispersions suitable for these waterproofing coating applications are typically made from emulsion polymerization of a monomer mixture comprising (meth)acrylamide, styrene and other acrylic monomers. However, when such aqueous polymer dispersions mix with cementitious materials upon application, hydrolysis of acylamino groups in the polymer results in the release of ammonia with unpleasant odor to the environment, typically in an amount of larger than 500 ppm (that is, >500 milligrams ammonia per kilogram of the aqueous polymer dispersion). It is desirable for the building industry to reduce the release of ammonia to meet international or national industry requirements such as the JC1066-2008 building material industry standard in China, which requires less than 500 ppm of ammonia release. To solve the ammonia release issue, attempts have been made to prepare aqueous polymer dispersions in the absence of (meth)acrylamide monomers. Unfortunately, these aqueous polymer dispersions fail to provide cementitious compositions comprising thereof with satisfactory mechanical properties, particularly balanced properties of tensile strength (at least 1.8 megapascals) and elongation at break (at least 70%, preferably at least 80%), as measured in accordance with GB/T23445-2009.

Therefore, there is a need to develop a polymer-modified cementitious composition with less than 100 ppm of ammonia release while providing coating membranes made therefrom with the above-described mechanical properties.

SUMMARY OF THE INVENTION

The present invention provides a polymer-modified cementitious composition that is a novel combination of a specific aqueous polymer dispersion with a cementitious material. The polymer in the aqueous polymer dispersion comprises, by weight based on the weight of the polymer, (a) more than 1% and up to 1.45% of structural units of a carboxylic acid monomer, (b) from 2% to 6% of structural units of a hydroxy-functional alkyl (meth)acrylate, (c) from 15% to 45% of structural units of a vinyl aromatic monomer, (d) from 50% to 80% of structural units of an additional alkyl (meth)acrylate, and (e) less than 0.1% of structural units of (meth)acrylamide. The polymer-modified cementitious composition of the present invention releases less than 100 ppm of ammonia, as measured according to JC1066-2008. Such polymer-modified cementitious composition can provide coating membranes made therefrom with tensile strength of 1.8 megapascals (MPa) or higher, and at the same time, elongation at break of 70% or higher or even 80% or higher, as determined according to GB/T23445-2009.

In a first aspect, the present invention is a polymer-modified cementitious composition, comprising:

(A) an aqueous polymer dispersion comprising a polymer, wherein the polymer comprises, by weight based on the weight of the polymer, (a) more than 1% and up to 1.45% of structural units of a carboxylic acid monomer, (b) from 2% to 6% of structural units of a hydroxy-functional alkyl (meth)acrylate, (c) from 15% to 45% of structural units of a vinyl aromatic monomer, (d) from 50% to 80% of structural units of an additional alkyl (meth)acrylate, and (e) less than 0.1% of structural units of (meth)acrylamide; and (B) a cementitious material.

In a second aspect, the present invention also relates to a method of preparing the polymer-modified cementitious composition of the first aspect. The method comprises admixing an aqueous polymer dispersion comprising a polymer with a cementitious material, wherein the polymer comprises, by weight based on the weight of the polymer, (a) more than 1% and up to 1.45% of structural units of a carboxylic acid monomer, (b) from 2% to 6% of structural units of a hydroxy-functional alkyl (meth)acrylate, (c) from 15% to 45% of structural units of a vinyl aromatic monomer, (d) from 50% to 80% of structural units of an additional alkyl (meth)acrylate, and (e) less than 0.1% of structural units of (meth)acrylamide.

DETAILED DESCRIPTION OF THE INVENTION

"Aqueous" composition or dispersion herein means that particles dispersed in an aqueous medium. By "aqueous medium" herein is meant water and from zero to 30%, by weight based on the weight of the medium, of water-miscible compound(s) such as, for example, alcohols, glycols, glycol ethers, glycol esters, glycerol, glyceryl ethers, glyceryl esters and the like.

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" reported herein can be calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g(calc.)$ is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in Kelvin. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

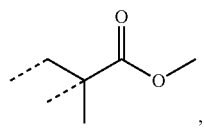

where the dotted lines represent the points of attachment of the structural unit to the polymer backbone.

The polymer useful in the present invention may comprise structural units of one or more carboxylic acid monomers. The carboxylic acid monomers can be α, β-ethylenically unsaturated carboxylic acids, monomers bearing an acid-forming group which yields or is subsequently convertible to, such an acid group (such as anhydride, (meth)acrylic anhydride, or maleic anhydride); and mixtures thereof. The carboxylic acid monomers may include acrylic acid, methacrylic acid, maleic acid, itaconic acid, crotonic acid, fumaric acid, a carboxylic acid functional (meth)acrylate, and mixtures thereof. The carboxylic acid functional (meth) acrylate useful in the present invention may have the structure of formula (I),

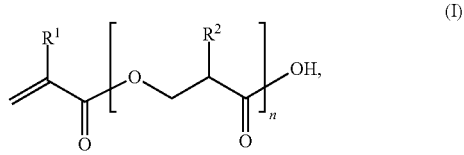

wherein n is an integer of from 1 to 12, from 1 to 10, from 1 to 8, from 1 to 5, from 1 to 4, or from 1 to 3; and $R^1$ and $R^2$ are each independently hydrogen (H) or methyl (—$CH_3$), and preferably H. Specific examples of carboxylic acid functional (meth)acrylates include 2-carboxyethyl acrylate, 2-carboxyethyl methacrylate, 2-carboxypropyl methacrylate, 2-carboxypropyl acrylate, and mixtures thereof. Preferred carboxylic acid monomers are selected from the group consisting of acrylic acid, methacrylic acid, 2-carboxyethyl acrylate, 2-carboxyethyl methacrylate, 2-carboxypropyl methacrylate, 2-carboxypropyl acrylate and itaconic acid. The polymer may comprise structural units of itaconic acid in an amount of zero or more, 0.05% or more, 0.08% or more, or even 0.1% or more, and at the same time, 0.5% or less, 0.4% or less, 0.3% or less, 0.2% or less, or even 0.15% or less, by weight based on the weight of the polymer. When the carboxylic acid monomer comprises the carboxylic acid functional (meth)acrylate, the polymer may comprise, by weight based on the weight of the polymer, 0.1% or more, 0.2% or more, 0.3% or more, 0.4% or more, 0.5% or more, 0.7% or more, 0.8% or more, 0.9% or more, or even 1% or more, and at the same time, 1.45% or less, 1.4% or less, 1.35% or less, 1.3% or less, or even 1.25% or less, of structural units of the carboxylic acid functional (meth) acrylate. "Weight of the polymer" in the present invention refers to the dry or solids weight of the polymer.

The polymer useful in the present invention may comprise structural units of carboxylic acid monomers in a combined amount of more than 1% (>1%), for example, 1.05% or more, 1.1% or more, 1.15% or more, 1.2% or more, or even 1.25% or more, at the same time, 1.45% or less, 1.4% or less, 1.35% or less, or even 1.3% or less, by weight based on the weight of the polymer.

The polymer useful in the present invention may further comprise structural units of one or more hydroxy-functional alkyl (meth)acrylates. Examples of suitable hydroxy-functional alkyl (meth)acrylates include hydroxyethyl (meth) acrylates including, for example, 2-hydroxyethyl acrylate and 2-hydroxyethyl methacrylate; hydroxypropyl (meth) acrylates including, for example, 2-hydroxypropylacrylate, 2-hydroxypropyl methacrylate, 3-hydroxypropyl acrylate, and 3-hydroxypropyl methacrylate; hydroxybutyl (meth) acrylates including, for example, 3-hydroxybutyl acrylate, 3-hydroxybutyl methacrylate, 4-hydroxybutyl acrylate, and 4-hydroxybutyl methacrylate; 6-hydroxyhexyl acrylate; 6-hydroxyhexylmethacrylate; 3-hydroxy-2-ethylhexyl acrylate; 3-hydroxy-2-ethylhexyl methacrylate; and mixtures thereof. The polymer may comprise, by weight based on the weight of the polymer, from 2% to 6%, from 2.5% to 5.5%, from 3% to 5%, from 3.5% to 4.5%, or from 3.5% to 4%, of structural units of the hydroxy-functional alkyl (meth)acrylate.

The polymer useful in the present invention may also comprise structural units of one or more vinyl aromatic monomers. The vinyl aromatic monomers can be styrene; butylstryene; methylstyrene; p-methoxystyrene; o-, m-, and p-methoxystyrene; o-, m-, and p-chlorostyrene; o-, m-, and p-trifluoromethylstyrene; o-, m-, and p-nitrostyrene; and mixtures thereof. Preferred vinyl aromatic monomer is styrene. The polymer may comprise, by weight based on the weight of the polymer, from 15% to 45%, from 15% to 40%, from 18% to 35%, or from 20% to 30%, of structural units of the vinyl aromatic monomer.

The polymer useful in the present invention may further comprise structural units of one or more additional alkyl (meth)acrylates that are different from the hydroxy-functional alkyl (meth)acrylates described above. The additional alkyl (meth)acrylates can be $C_1$-$C_{20}$-alkyl, $C_2$-$C_{12}$-alkyl, or $C_1$-$C_4$-alkyl (meth)acrylates. Suitable additional alkyl (meth)acrylates may include, for example, methyl acrylate, methyl methacrylate, ethyl acrylate, ethyl methacrylate, butyl acrylate, butyl methacrylate, 2-ethylhexyl acrylate, nonyl acrylate, decyl acrylate, lauryl acrylate, and combinations thereof. Preferably, the additional alkyl (meth)acrylate is a $C_1$-$C_4$-alkyl (meth)acrylate. More preferably, the additional alkyl (meth)acrylate is selected from the group consisting of methyl acrylate, methyl methacrylate, ethyl acrylate, ethyl (meth)acrylate, butyl acrylate and butyl methacrylate. The polymer may comprise, based on the weight of the polymer, from 50% to 80%, from 55% to 80%, from 60% to 78%, or from 65% to 75%, of structural units of the additional alkyl (meth)acrylate.

The polymer useful in the present invention may further comprise structural units of one or more ethylenically unsaturated monomers carrying at least one alkoxysilane functionality (hereinafter "alkoxysilane functional monomer"), preferably hydrolyzable alkoxysilane functionality. Suitable alkoxysilane functional monomers include, for example, vinyltrialkoxysilanes such as vinyltrimethoxysilane; alkylvinyldialkoxysilanes; (meth)acryloxyalkyltrialkoxysilanes such as, 3-methacryloxyethyltrimethoxysilane and 3-methacryloxypropyltrimethoxysilane; derivatives thereof, and combinations thereof. The polymer may comprise, by weight based on the weight of the polymer, from zero to 2%, from 0.05% to 1.5%, from 0.1% to 1%, from 0.15% to 0.7%, or from 0.2% to 0.6%, of structural units of the alkoxysilane functional monomer.

The polymer useful in the present invention may further comprise structural units of one or more multiethylenically unsaturated monomers including di-, tri-, tetra-, or higher multifunctional ethylenically unsaturated monomers. Examples of suitable multiethylenically unsaturated monomers include butadiene, allyl (meth)acrylate, divinyl benzene, ethylene glycol dimethacrylate, butylene glycol dimethacrylate, and mixtures thereof. The polymer may comprise, by weight based on the weight of the polymer, from zero to 1% of structural units of the multiethylenically unsaturated monomer, for example, 0.8% or less, 0.6% or less, 0.4% or less, or even zero.

The polymer useful in the present invention may comprise, by weight based on the weight of the polymer, less than 0.1% of structural units of (meth)acrylamide. The polymer can be substantially free of structural units of methacrylamide, acrylamide, and mixtures thereof. "Substantially free" herein means that the concentration of structural units of acrylamide and/or methacrylamide is zero, and can be less than 0.05%, or even less than 0.01%, by weight based on the weight of the polymer.

The polymer useful in the present invention may optionally comprise structural units of one or more ethylenically unsaturated nitriles, such as acrylonitrile or methacrylonitrile. The amount of structural units of the ethylenically unsaturated nitriles in the polymer can be, by weight based on the weight of the polymer, less than 5%, less than 4%, less than 3%, less than 2%, less than 1%, or even less than 0.5%.

The polymer useful in the present invention may comprise, by weight based on the weight of the polymer, from 1.1% to 1.35% of structural units of the carboxylic acid monomer selected from the group consisting of acrylic acid, methacrylic acid, 2-carboxyethyl acrylate, 2-carboxyethyl methacrylate, 2-carboxypropyl methacrylate, 2-carboxypropyl acrylate and itaconic acid; from 3% to 5% of structural units of the hydroxy-functional alkyl (meth)acrylate selected from the group consisting of 2-hydroxyethyl acrylate and 2-hydroxyethyl methacrylate; from 20% to 30% of structural units of styrene; and from 65% to 75% of structural units of the additional alkyl (meth)acrylate including, for example, butyl (meth)acrylate.

The polymer useful in the present invention may have a Fox Tg of −30 degree Celsius (° C.) or higher, −25° C. or higher, −22° C. or higher, or even −20° C. or higher, and at the same time, 0° C. or less, −3° C. or less, −4° C. or less, or even −5° C. or less.

The polymer useful in the present invention may be prepared by free-radical polymerization, preferably emulsion polymerization, of the monomers described above. Emulsion polymerization is a preferred process. Total weight concentration of the monomers for preparing the polymer is equal to 100%. A mixture of the monomers may be added neat or as an emulsion in water; or added in one or more additions or continuously, linearly or nonlinearly, over the reaction period of preparing the polymer. Temperature suitable for emulsion polymerization processes may be lower than 100° C., in the range of from 30 to 95° C., or in the range of from 50 to 90° C. Multistage free-radical polymerization using the monomers described above can be used, which at least two stages are formed sequentially, and usually results in the formation of the multistage polymer comprising at least two polymer compositions.

In the polymerization process of preparing the polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the polymer, one or more surfactants may be added prior to or during the polymerization of the monomers, or combinations thereof. A portion of the surfactant can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; ethoxylated alcohols or phenols; and mixtures thereof. The amount of the surfactants used is typically in the range of from 0.1% to 10% or from 1% to 5%, by weight based on the weight of total monomers used for preparing the polymer.

In the polymerization process of preparing the polymer, one or more chain transfer agents may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, and mixtures thereof. The chain transfer agent may be used in an effective amount to control the molecular weight of the polymer, for example, in an amount of from zero to 1%, from 0.1% to 0.7%, or from 0.15% to 0.5%, by weight based on the total weight of monomers used for preparing the polymer.

After completing the polymerization of the polymer, the obtained aqueous polymer dispersion may be optionally neutralized by one or more bases as neutralizers to a pH value, for example, at least 6, from 6 to 10, or from 7 to 9. The bases may lead to partial or complete neutralization of the ionic or latently ionic groups of the polymer. Examples of suitable bases include alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1, 12-diamine, polyethyleneimine or polyvinylamine; aluminum hydroxide; and mixtures thereof.

The aqueous polymer dispersion useful in the present invention may have a number average particle size in the range of from 100 to 500 nanometers (nm), from 150 to 400 nm, or from 200 to 350 nm, as determined by Brookhaven BI-90 Particle Size Analyzer.

The polymer-modified cementitious composition of the present invention may further comprise one or more defoamers. "Defoamers" herein refer to chemical additives that reduce and hinder the formation of foam. Defoamers may include silicone-based defoamers, mineral oil-based defoamers, ethylene oxide/propylene oxide-based defoamers, alkyl polyacrylate defoamers, and mixtures thereof. Suitable commercially available defoamers include, for example, TEGO Airex 902 W and TEGO Foamex 1488 polyether siloxane copolymer emulsions both available from TEGO, BYK-024 silicone defoamer available from BYK, NOPCO NXZ mineral oil defoamer available from San Nopco, and mixtures thereof. The defoamer may be present, by weight based on the total weight of the polymer, generally in an amount of from zero to 3%, from 0.1% to 2%, or from 0.3% to 1%.

The polymer-modified cementitious composition of the present invention may further comprise one or more dispersants. The dispersants may include polyacids including homopolymers and copolymers based on polycarboxylic acids, including those that have been hydrophobically- or hydrophilically-modified, for example, polyacrylic acid or polymethacrylic acid or maleic anhydride with various monomers such as styrene, acrylate or methacrylate, diisobutylene, and other hydrophilic or hydrophobic monomers; salts thereof; and mixtures thereof. The dispersant may be present, by weight based on the total weight of the polymer, from zero to 3%, from 0.1% to 2%, or from 0.3% to 1.5%.

The polymer-modified cementitious composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), and mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HMHEC. The thickener may be present, by weight based on the total weight of the aqueous coating composition, in an amount of from zero to 5%, from 0.05% to 3%, or from 0.1% to 2%.

The polymer-modified cementitious composition of the present invention also comprises one or more cementitious materials. The cementitious materials may include, for example, Portland cement, pozzolanic cement, hydraulic limes, fly ash, natural cement, high alumina cement, and mixtures thereof. The cementitious materials may be present in a combined amount of from 5% to 90%, from 10% to 80%, from 20% to 70%, from 30% to 60%, or from 40% to 50%, by weight based on the total weight of the polymer-modified cementitious composition.

The polymer-modified cementitious composition of the present invention may further comprise inorganic fillers. Suitable inorganic fillers may include, for example, sand, calcium carbonate, silica, dolomite, fumed silica, kaolin, talc, mica, and mixtures thereof.

The polymer-modified cementitious composition of the present invention may further comprise one or more additives selected from superplasticizers such as MIGHTY 100 powder superplasticizer available from Kao Chemicals, SIKA VISCOCRETE polycarboxylic superplasticizer available from Sika, and MELFLUX 2651F polycarboxylic superplasticizer available from BASF; coalescents such as TEXANOL ester alcohol available from Eastman Chemical Company and DOWANOL™ DPnB glycol ether available from The Dow Chemical Company; water repellent agents such as DOWSIL™ SHP 60 Plus Silicone hydrophobic powder available from The Dow Chemical Company, ELOTEX Seal 80 Silicone hydrophobic powder available from AkzoNobel; and mixtures thereof (DOWANOL and DOWSIL are trademarks of The Dow Chemical Company). These additives may be present, by weight based on the weight of the polymer, in a combined amount of from zero to 5%, from 0.5% to 4%, or from 1% to 3%.

The polymer-modified cementitious composition the present invention may be prepared by admixing the aqueous polymer dispersion with the cementitious material. The polymer-modified cementitious composition are usually supplied in a two-component package and mixed upon application. The two-component polymer-modified cementitious composition typically include: the aqueous polymer dispersion, and optionally additional components such as the thickener and the defoamer, usually forming "Part A"; and the cementitious material mixing with optional fillers, usually forming "Part B". The Part A and Part B are then mixed to form the polymer-modified cementitious composition. The Part A and the Part B may be mixed at a weight ratio of Part A to Part B in the range of from 1:0.8 to 1:3.5, from 1:1 to 1:3, or from 1:1.5 to 1:2.5. Total solids of the polymer-modified cementitious composition may be in the range of from 50% to 95%, from 65% to 90%, or from 70% to 80% by weight of the polymer-modified cementitious composition. The resultant polymer-modified cementitious composition of the present invention may cause less than 100 ppm of ammonia release or even less than 50 ppm of ammonia release, as measured in accordance with JC1066-2008 (Standard for limit of harmful substances of building waterproofing coatings), which was published by National Development and Reform Commission of the P. R. China, issued on Feb. 1, 2008, and put into effect on Jul. 1, 2008.

The polymer-modified cementitious composition of the present invention has good workability as indicated by a rating score of 4 or higher, according to the test methods described in the Examples section below. The polymer-modified cementitious composition upon drying can also provide coating membranes made therefrom with balanced properties of tensile strength of 1.8 MPa or higher and elongation at break of 70% or more, as determined by GB/T23445-2009. For example, the tensile strength can be 1.9 MPa or more, 2.0 MPa or more, 2.1 MPa or more, 2.2 MPa or more, 2.3 MPa or more, 2.4 MPa or more, 2.5 MPa or more, 2.6 MPa or more, 2.7 MPa or more, or even 2.8 MPa or more; and the elongation at break can be 70% or more, 75% or more, 80% or more, 85% or more, 90% or more, 95% or more, or even 100% or more. GB/T23445-2009 herein refers to the national standard for polymer-modified cement compounds for waterproofing membrane, which was published by State General Administration of the P. R. China for Quality Supervision, Inspection and Quarantine, issued on Mar. 28, 2009, and put into effect on Jan. 1, 2010.

The present invention further provides a method of preparing the polymer-modified cementitious composition by admixing the aqueous polymer dispersion and the cementitious material.

The present invention also relates to a process of using the polymer-modified cementitious composition. The process may comprise the following: applying the polymer-modified cementitious composition to a substrate, and drying, or allowing to dry, the applied polymer-modified cementitious composition.

The present invention also relates to a coating membrane. The coating membrane typically has a thickness in the range of from 1.0 to 2.0 millimeters (mm) or from 1.2 to 1.5 mm. The coating membrane may be prepared by providing the polymer-modified cementitious composition; applying the polymer-modified cementitious composition to a substrate; and drying, or allowing to dry, the polymer-modified cementitious composition to form the coating membrane. The polymer-modified cementitious composition can be applied to the substrate by any known methods, for example, manual troweling or brushing, or rolling or spraying. The obtained surface may be further smoothed by troweling. The substrate can be any substrate including, for example, concrete, bitumen, metal, or wood. Drying may be conducted at a temperature in the range of from 5 to 50° C., from 15 to 40° C., or from 20 to 30° C. Time for drying the polymer-modified cementitious composition may depend on various factors including, for example, thickness of the polymer-modified cementitious composition applied to the substrate, and outdoor conditions such as temperature, relative humidity and wind. For example, the time for drying the polymer-modified cementitious composition may be chosen between 0.5 to 6 hours or between 2 to 4 hours. The polymer-modified cementitious composition of the present invention can be used in various applications, for example, waterproofing membranes in kitchen, bathroom, balcony, waterproofing building materials in tunnels and bridges, and building repair materials on roofs and floors.

EXAMPLES

Some embodiments of the invention will now be described in the following Examples, wherein all parts and percentages are by weight unless otherwise specified.

The following materials are used in synthesis of aqueous polymer dispersions: Butyl acrylate (BA), styrene (ST), acrylic acid (AA), hydroxyethyl methacrylate (HEMA) and itaconic acid (IA) are all used as monomers.

2-Carboxyethyl acrylate (CEA) is available from Energy Chemical.

TERGITOL™ 15-S-40 surfactant, available from The Dow Chemical Company, is an alkyl polyoxyethylene ether type nonionic surfactant (TERGITOL is a trademark of The Dow Chemical Company).

EMULSOGEN EPA 073 surfactant ("EPA 073"), available from Clariant, is an alkyl polyoxyethylene ether sodium sulfate type anionic surfactant.

Sodium persulfate (SPS) is used as an initiator catalyst.

t-Butyl hydroperoxide (t-BHP) is used as a chaser catalyst.

Sodium bisulfite anhydrous (SBS) is used as a chaser activator.

NOPCO NXZ defoamer, available from San Nopco, is a mixture of mineral oil and polyethers.

The following standard analytical equipment and methods are used in the Examples.

Ammonia Release

The amount of ammonia release was measured according to JC1066-2008. Details are given as follows:

(a) Sample preparation: Two latex samples were measured with 5.000 grams (g) (±0.001 g) for each sample, and dissolved with deionized (DI) water in a 300 milliliters (mL) beaker, respectively. The resultant solution was then transferred into a 500 mL distillation flask with a total solution volume of 200 mL.

(b) Distillation: Solid sodium hydroxide (NaOH) was placed into the above solution to adjust the pH value higher than 12. Several explosion-proof glass beads were also placed into the above solution. Pipette was used to introduce exactly 20 mL of standard sulfuric acid ($H_2SO_4$) (0.1 mol/L) into a 500 mL conical flask. Three to four drops of a pH indicator solution was also added. The solution in the distillation flask was distilled. The distillation was continued until the distillate collected into the conical flask reached a total volume of 180 mL. The pH indicator solution was prepared by mixing 50 mL of Methyl Red solution in ethanol (concentration: 2 g/L) and 50 mL of Methylene Blue solution in ethanol (concentration: 1 g/L).

(c) Titration: Titration was conducted by using a standard NaOH solution (0.1 mol/L) for neutralizing excess $H_2SO_4$ solution above until the color of the pH indicator changed from light purple to grey green. The volume of the NaOH solution used was recorded as V1.

(d) Preparation and evaluation of a blank sample: At the same time, the above steps (a) to (c) were repeated except that the latex sample in step (a) was replaced by the same amount of DI water. The volume of the NaOH solution used in the step of titration was recorded as V2.

(e) Calculation of the amount of ammonia release:

$$x = \frac{(V2 - V1) * c * 0.01703}{m} * 1000$$

where x=ammonia release amount, g/kg;
C=concentration of the standard NaOH solution, mol/L;
V1=volume of the NaOH solution used for the latex sample, mL;
V2=volume of the NaOH solution used for the blank sample, mL;
0.01703=equivalent amount of ammonia (g) with 1.00 mL standard NaOH solution (1.000 mol/L); and
m=weight of the latex sample, g.

Workability

The liquid part and the powder part of a polymer-modified cementitious composition sample were mixed together before applying by brush, based on formulations given in Table 2. The obtained polymer-modified cementitious composition was brushed to pre-fabricated concrete panels. Workability of the polymer-modified cementitious composition is ranked by rating scores of from 1 to 5, where 5 is set as the highest rating score, based on the following standards:

5—Very easy to brush, no dragging or noticeable aggregates

4—Easy to brush, no dragging or noticeable aggregates

3—Easy to brush, slightly dragging or slightly noticeable aggregates

2—Slightly difficult to brush, noticeable aggregates

1—Difficult to brush, apparent aggregates

Rating scores of 4 or higher indicate acceptable workability. The higher the rating score, the better the workability of the polymer-modified cementitious composition.

Mechanical Properties

The mechanical properties of a polymer-modified cementitious composition were measured according to GB/T23445-2009. The liquid part and the powder part of such polymer-modified cementitious composition were mixed together under a mixing speed of 800 revolutions per minute (rpm) for 5 minutes to form a paste. The paste was then left for settling for 3 minutes and then applied to a piece of release paper by two layers in 24 hours to obtain a final dry film thickness of 1.5 mm±0.2 mm. The resultant coating membranes were cured in a controlled temperature room (CTR, 23±2° C., 50%±5% humidity) for 96 hours, and then in an oven at 40° C. for 48 hours. The coating membrane samples were taken out of the oven and left in CTR for 4 hours prior to testing the mechanical properties. The cured membrane samples were cut into 6 pieces of dumb-bell shape and then tensile strength and elongation at break properties were tested by Universal Testing Machine at a stretching rate of 200 mm/minute.

Synthesis of Polymer Dispersion 1

First, a monomer mixture was prepared by mixing 389.62 g of DI water, 37.18 g of EPA 073 surfactant (28% actives), 30.76 g of 15-S-40 surfactant (70% actives), 1.80 g of IA, 72.00 g of HEMA, 18.00 g of AA, 1320.58 g of BA and 395.78 g of ST.

Into a one gallon vessel, equipped with a reflux condenser, addition funnels and stirrer, an initial water charge was added with agitation at 130 rpm. The reaction vessel was heated to 85° C. One hundred grams of a preformed seed emulsion (a waterborne styrene-acrylic polymer emulsion with a particle size of 100 nm and a solids content of 40%) and an initial catalyst solution (1.90 g of SPS in 12.57 g of DI water) were charged to the reaction vessel. The monomer mixture was then added into the reaction vessel together with a catalyst solution of 5.65 g of SPS in 136.71 g of DI water over a period of 210 minutes at temperature between 84° C. and 86° C. After completing addition of the monomer mixture and catalyst, the contents in the reaction vessel were cooled to room temperature (23±2° C.). During the reaction mixture was cooled down, a mixture of 3.59 g of t-BHP in 57.65 g of DI water, and 3.49 g of SBS in 57.65 g of DI water were added when the temperature was at 70° C.

Synthesis of Polymer Dispersion A

The aqueous polymer dispersion A was synthesized according the same procedure as synthesis of polymer dispersion 1 above, except that the monomer mixture used was as follows:

A monomer mixture was prepared by mixing 389.62 g of DI water, 30.98 g of EPA 073 surfactant (28% actives), 25.63 g of 15-S-40 surfactant (70% actives), 1.80 g of IA, 72.00 g of HEMA, 27.00 g of AA, 1311.54 g of BA and 395.78 g of ST.

Synthesis of Polymer Dispersion B

The aqueous polymer dispersion B was synthesized according the same procedure as synthesis of polymer dispersion 1 above, except that the amount of BA and AA in the monomer mixture was 1329.63 g and 9.00 g, respectively.

Synthesis of Polymer Dispersion 2

First, a monomer mixture was prepared by mixing 379.42 g of DI water, 37.18 g of EPA 073 surfactant (28% actives), 30.76 g of 15-S-40 surfactant (70% actives), 1.80 g of IA, 72.00 g of HEMA, 18.00 g of CEA, 1320.58 g of BA and 395.70 g of ST.

Into a one gallon vessel, equipped with a reflux condenser, addition funnels and stirrer, an initial water charge was added with agitation at 130 rpm. The reaction vessel was heated to 85° C. One hundred grams of a preformed seed emulsion (a waterborne styrene-acrylic polymer emulsion with a particle size of 100 nm and a solids content of 40%) and an initial catalyst solution (1.90 g of SPS in 12.57 g of DI water) were charged to the reaction vessel. The monomer mixture was added over a period of 210 minutes with temperature between 85° C. and 87° C. After completing addition of the monomer mixture and catalyst, the contents in the reaction vessel were cooled to room temperature. During the reaction mixture was cooled down, a mixture of 3.59 g of t-BHP in 57.65 g of DI water, and 3.49 g of SBS in 57.65 g of DI water were added when the temperature was at 70° C.

Synthesis of Polymer Dispersion 3

The aqueous polymer dispersion 3 was synthesized according to the same procedure as synthesis of polymer dispersion 2 above, except that the amount of CEA and ST in the monomer mixture was 22.50 g and 391.20 g, respectively.

Synthesis of Polymer Dispersion 4

The aqueous polymer dispersion 4 was synthesized according to the same procedure as synthesis of polymer dispersion 2 above, except that the amount of CEA used in the monomer mixture was adjusted to 9.0 g and 9.0 g of AA was further added into the monomer mixture.

Synthesis of Polymer Dispersion C

The aqueous polymer dispersion C was synthesized according to the same procedure as synthesis of polymer dispersion 2 above, except that the amount of CEA and ST in the monomer mixture was 9.0 g and 404.70 g, respectively.

Synthesis of Polymer Dispersion D

The aqueous polymer dispersion D was synthesized according to the same procedure as synthesis of polymer dispersion 2 above, except that the amount of CEA and ST in the monomer mixture was 36.0 g and 377.70 g, respectively.

Synthesis of Polymer Dispersion E

The aqueous polymer dispersion E was synthesized according to the same procedure as synthesis of polymer dispersion 2 above, except that the amount of ST used in the monomer mixture was 386.70 g and 9.0 g of AA was further added into the monomer mixture.

Compositions and properties of the above obtained aqueous polymer dispersions are given in Table 1 below.

TABLE 1

Compositions and properties of aqueous polymer dispersions

| | Polymer composition | pH | Solids content, % | Viscosity[1], centipoise | Particle Size[2], nm | $T_g$[3], °C |
|---|---|---|---|---|---|---|
| Polymer Dispersion 1 | 21.9ST/73.0BA/1.0AA/4.0HEMA/0.1IA | 4.78 | 56.7 | 362 | 247 | −10 |
| Polymer Dispersion A | 21.9ST/72.5BA/1.5AA/4.0HEMA/0.1IA | 4.68 | 56.7 | 250 | 205 | −10 |
| Polymer Dispersion B | 21.9ST/73.5BA/0.5AA/4.0HEMA/0.1IA | 5.25 | 56.7 | 276 | 264 | −10 |
| Polymer Dispersion 2 | 21.9ST/73.0BA/1.0CEA/4.0HEMA/0.1IA | 5.31 | 56.4 | 219 | 223 | −10 |
| Polymer Dispersion 3 | 21.65ST/73.0BA/1.25CEA/4.0HEMA/0.1IA | 5.19 | 56.6 | 283 | 223 | −10 |
| Polymer Dispersion 4 | 21.9ST/73.0BA/0.5CEA/0.5AA/4.0HEMA/0.1IA | 5.09 | 56.3 | 304 | 234 | −10 |
| Polymer Dispersion C | 22.4ST/73.0BA/0.5CEA/4.0HEMA/0.1IA | 5.57 | 56.6 | 198 | 230 | −10 |
| Polymer Dispersion D | 20.9ST/73.0BA/2.0CEA/4.0HEMA/0.1IA | 4.99 | 56.5 | 367 | 217 | −10 |
| Polymer Dispersion E | 21.4ST/73.0BA/1.0CEA/0.5AA/4.0HEMA/0.1IA | 4.90 | 56.6 | 427 | 235 | −10 |

[1]Viscosities measured by BROOK FIELD LVDV-1 Prime viscosity detector with 63# spindle, 60 rpm;
[2]Number average particle size as determined by Brookhaven BI-90 Particle Size Analyzer;
[3]Tg calculated by the Fox equation.

Examples (Exs) 1-4 and Comparative (Comp) Exs A-E

The above obtained aqueous polymer dispersions were used to prepare polymer-modified cementitious compositions of Exs 1-4 and Comp Exs A-E, based on formulations given in Table 2. The liquid part and the powder part were mixed together under stirring at 800 rpm for 5 minutes, and then stabilized for 1-3 minutes. The as prepared cementitious compositions were evaluated according to the test methods described above and properties are given in Table 3.

TABLE 2

Polymer-modified cementitious composition

| | Supplier | Dosage (g) |
|---|---|---|
| Liquid Part | | |
| Polymer Dispersion | | 90 |
| Water | | 9.4 |
| NOPCO NXZ Defoamer | San Nopco | 0.3 |
| OROTAN™ 1850E Dispersant (Polycarboxylic acid homopolymer) | The Dow Chemical Company | 0.3 |
| Powder Part | | |
| Standard Cement (Grade 42.5) | China Building Materials Academy Co., Ltd. | 90 |
| CaCO₃ (325 mesh) | Guangfu Building Materials Fine Chemicals Industry Co., Ltd | 45 |
| Sand (70-140 mesh) (Silica quartz sand) | Shanghai Jianda Building Materials Company | 45 |

*OROTAN is a trademark of The Dow Chemical Company;
Weight ratio of Liquid Part:Powder Part = 1:1.8

As shown in Table 3, the polymer-modified cementitious compositions of Exs 1-4 only caused less than 50 ppm of ammonia release and met the requirement of JC1066-2008. The inventive polymer-modified cementitious compositions also showed good workability (rating: 4). In addition, the polymer-modified cementitious compositions of Exs 1-4 all provided coating membranes made therefrom with balanced tensile strength (>1.8 MPa) and elongation at break (>70%). Particularly, the polymer-modified cementitious compositions of Exs 2-4 comprising the emulsion polymer made from monomers comprising CEA provided coating membranes with surprisingly balanced properties of tensile strength (>1.8 MPa) and elongation at break (>80%). In contrast, polymer-modified cementitious compositions of Comp Exs A-E all provided undesirably low tensile strength and/or low elongation at break.

TABLE 3

Properties of polymer-modified cementitious composition

| | Type of polymer dispersion | Amount of Ammonia release (ppm) | Workability rating score | Tensile strength (MPa) | Elongation at break (%) |
|---|---|---|---|---|---|
| Ex 1 | Polymer Dispersion 1 | 37 | 4 | 2.25 | 70.3 |
| Comp Ex A | Polymer Dispersion A | 39 | 4 | 3.28 | 45.4 |
| Comp Ex B | Polymer Dispersion B | 33 | 4 | 1.64 | 61.3 |
| Ex 2 | Polymer Dispersion 2 | 35 | 4 | 2.44 | 109 |
| Ex 3 | Polymer Dispersion 3 | 34 | 4 | 2.28 | 90 |
| Ex 4 | Polymer Dispersion 4 | 33 | 4 | 2.84 | 81 |
| Comp Ex C | Polymer Dispersion C | 35 | 4 | 1.32 | 181 |
| Comp Ex D | Polymer Dispersion D | 39 | 3 | 2.38 | 55 |
| Comp Ex E | Polymer Dispersion E | 36 | 4 | 2.94 | 58 |

What is claimed is:

1. A polymer-modified cementitious composition, comprising:
 (A) an aqueous polymer dispersion comprising a polymer, wherein the polymer comprises, by weight based on the weight of the polymer, (a) more than 1% and up to 1.45% of structural units of a carboxylic acid monomer,
(b) from 2% to 6% of structural units of a hydroxy-functional alkyl (meth)acrylate,
(c) from 15% to 45% of structural units of a vinyl aromatic monomer,
(d) from 50% to 80% of structural units of an additional alkyl (meth)acrylate, and
(e) less than 0.1% of structural units of (meth)acrylamide; and
(B) a cementitious material.

2. The polymer-modified cementitious composition of claim 1, wherein the polymer comprises, by weight based on the weight of the polymer, from 1.1% to 1.4% of structural units of the carboxylic acid monomer.

3. The polymer-modified cementitious composition of claim 1, wherein the carboxylic acid monomer comprises a carboxylic acid functional (meth)acrylate having the structure of formula (I),

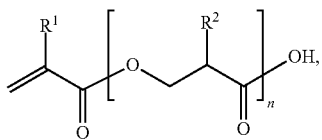

where n is an integer of from 1 to 12, and $R^1$ and $R^2$ are each independently hydrogen or methyl.

4. The polymer-modified cementitious composition of claim 3, wherein the polymer comprises, by weight based on the weight of the polymer, from 0.3% to 1.45% of structural units of the carboxylic acid functional (meth)acrylate.

5. The polymer-modified cementitious composition of claim 1, wherein the carboxylic acid monomer is selected from the group consisting of acrylic acid, methacrylic acid, 2-carboxyethyl acrylate, 2-carboxyethyl methacrylate, 2-carboxypropyl methacrylate, 2-carboxypropyl acrylate and itaconic acid.

6. The polymer-modified cementitious composition of claim 5, wherein the polymer comprises, by weight based on the weight of the polymer, from 0.1% to 0.5% of structural units of itaconic acid.

7. The polymer-modified cementitious composition of claim 1, wherein the additional alkyl (meth)acrylate is a $C_1$-$C_4$-alkyl (meth)acrylate.

8. The polymer-modified cementitious composition of claim 1, wherein the polymer has a Tg in the range of from −25 to −5° C.

9. The polymer-modified cementitious composition of claim 1, wherein the polymer comprises, by weight based on the weight of the polymer,
from 1.1% to 1.35% of structural units of the carboxylic acid monomer selected from the group consisting of acrylic acid, methacrylic acid, 2-carboxyethyl acrylate, 2-carboxyethyl methacrylate, 2-carboxypropyl methacrylate, 2-carboxypropyl acrylate and itaconic acid;
from 3% to 5% of structural units of the hydroxy-functional alkyl (meth)acrylate selected from the group consisting of 2-hydroxyethyl acrylate and 2-hydroxyethyl methacrylate;
from 20% to 30% of structural units of styrene; and
from 65% to 75% of structural units of the additional alkyl (meth)acrylate selected from the group consisting of methyl acrylate, methyl methacrylate, butyl acrylate, and butyl methacrylate.

10. The polymer-modified cementitious composition of claim 1, further comprising a filler, a defoamer, a thickener, a dispersant, or mixtures thereof.

11. A method of preparing a polymer-modified cementitious composition, comprising admixing an aqueous polymer dispersion comprising a polymer with a cementitious material, wherein the polymer comprises, by weight based on the weight of the polymer,
(a) more than 1% and up to 1.45% of structural units of a carboxylic acid monomer,
(b) from 2% to 6% of structural units of a hydroxy-functional alkyl (meth)acrylate,
(c) from 15% to 45% of structural units of a vinyl aromatic monomer,
(d) from 50% to 80% of structural units of an additional alkyl (meth)acrylate, and
(e) less than 0.1% of structural units of (meth)acrylamide.

* * * * *